INVENTOR
Ronald E. Grillot
James G. Farrar

BY Scofield, Kokjer, Scofield + Lowe
ATTORNEYS

INVENTOR
Ronald E. Grillot
James G. Farrar
BY
Scofield, Kokjer, Scofield & Lowe
ATTORNEYS

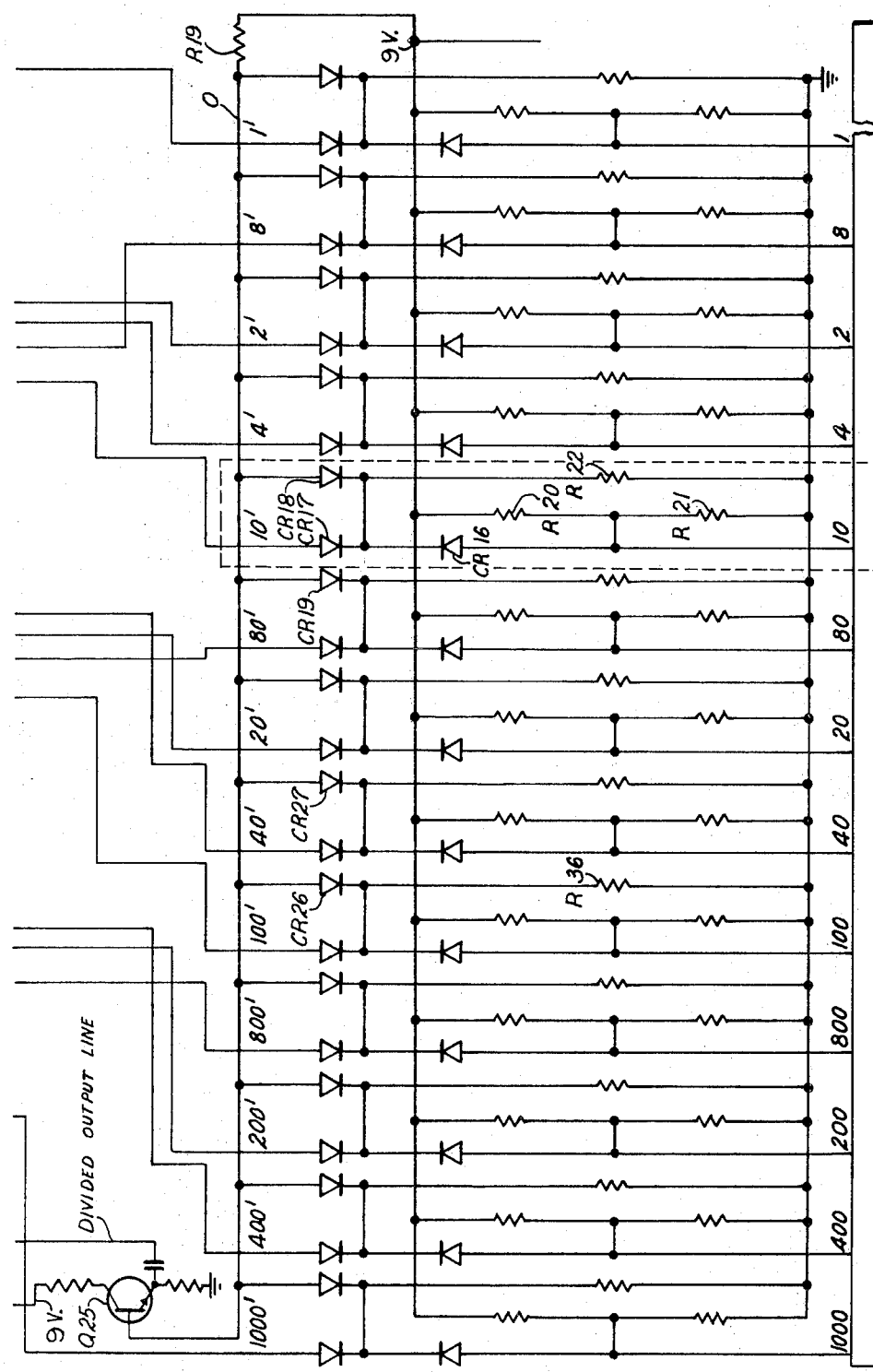

INVENTOR
Ronald E. Grillot
James G. Farrar

INVENTOR
Ronald E. Grillot
James G. Farrar

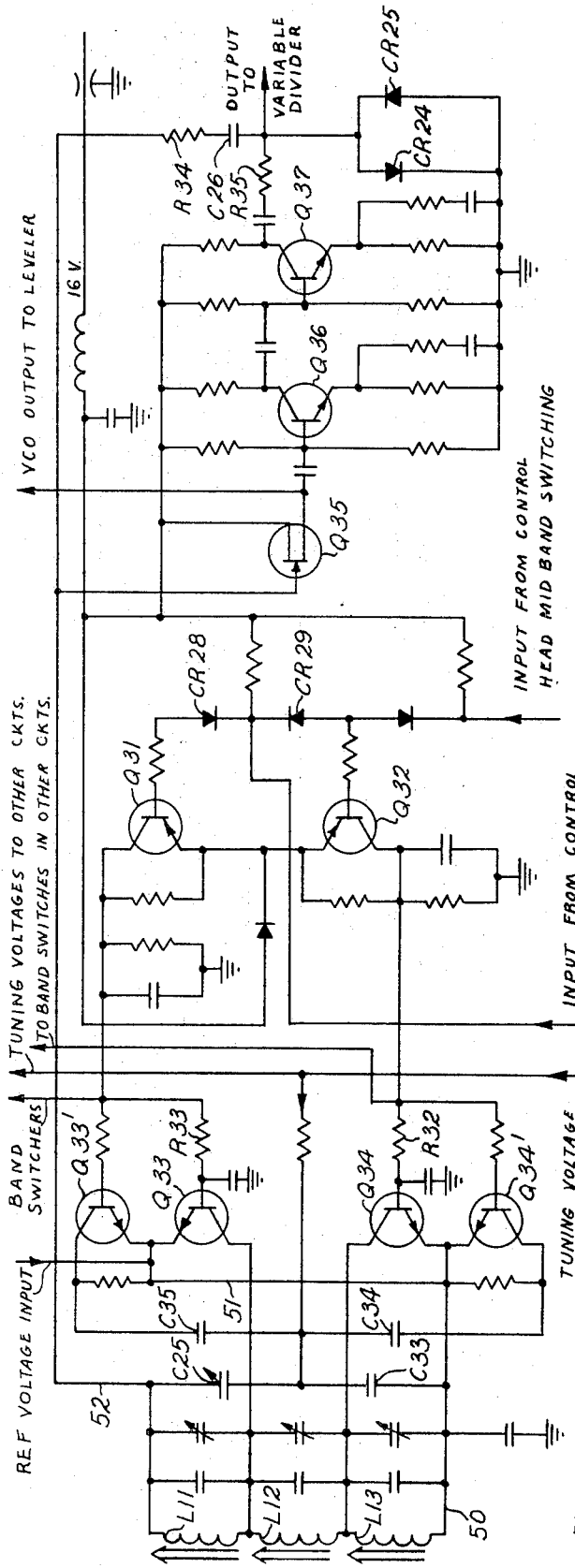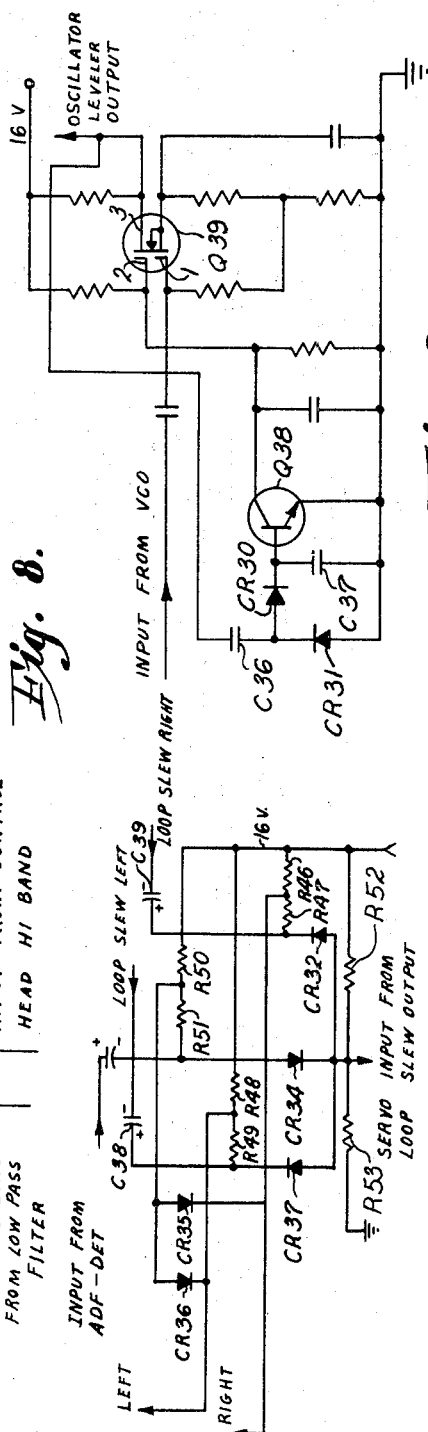
Fig. 8.
Fig. 9.
Fig. 11.
INVENTOR
Ronald E. Grillot
James G. Farrar
BY
ATTORNEYS United States Patent Office 3,564,548
Patented Feb. 16, 1971

3,564,548
METHOD AND APPARATUS FOR CRYSTAL CONTROLLED AUTOMATIC DIRECTION FINDER
Ronald E. Grillot, Olathe, Kans., and James G. Farrar, Lee's Summit, Mo., assignors to King Radio Corporation, Olathe, Kans., a corporation of Kansas
Filed June 10, 1968, Ser. No. 735,853
Int. Cl. G01s 3/42
U.S. Cl. 343—117  33 Claims

ABSTRACT OF THE DISCLOSURE

A crystal controlled ADF (Automatic Direction Finder) utilizes a stabilized master oscillator (SMO) and a single reference crystal to provide digital frequency selection in preselected increments of any desired frequency within the tuning range of the ADF.

A reference frequency is derived from the single reference crystal and is used as a comparison for a newly selected frequency. A voltage controlled oscillator (VCO) is tuned by a varactor diode from a portion of the SMO circuit. The output of the VCO is fed to a variable frequency divider which divides the VCO frequency. A frequency discriminator brings the VCO frequency close to the reference frequency and a phase detector provides the additional fine control that brings the VCO to the exact selected frequency within the limits of the crystal reference.

BACKGROUND AND BRIEF DESCRIPTION OF THE INVENTION

A true ADF did not become commercially available until the late 1930's. Until that time, various other methods and devices such as the radio direction finder, radio compass and A-N range were used. All of these navigation devices utilized a low frequency/medium frequency (LF/MF) radio receiver.

The ADF, which has found wide acceptance in general and commercial aviation today, uses a sense antenna, a loop antenna, a special receiver, a means for combining the sense and the loop signals, a means for orienting the loop antenna or its equivalent device for a null and a means to display the loop antenna position. The bearing of the signal to which the receiver is tuned is automatically displayed on a bearing indicator.

As suggested above, the primary purpose of an ADF is to show the direction from which a radio signal is arriving (direction of arrival) at the aircraft. The bearing indicator will accordingly display the bearing (the angle relative to the nose of the aircraft from which the signal is arriving) to the station.

Operation of an ADF is commenced with setting the transmitting frequency of the desired station into the frequency control head. This is referred to as channeling the ADF receiver to the desired frequency. Upon "channeling the receiver" the bearing information may be utilized by the pilot so that he may align his aircraft in an appropriate direction to intersect the instrument landing system (ILS). Of course, other uses such as cross-country navigation and obtaining a triangulation fix on a particular location are enhanced.

The operability of conventional ADF receivers is predicated on the fact that the transmitting station emits an electrostatic field and an electromagnetic field with its associated electromagnetic wave. The electrostatic field is sensed by the sense antenna while the electromagnetic field is sensed by the loop antenna, both being part of the ADF receiver system.

A primary object of the invention is to provide a new and improved automatic direction finder (ADF).

Another object of the invention is to provide an ADF having crystal frequency accuracy that requires a minimum of crystals. An important feature of the invention is the utilization of a single crystal in frequency selection and ADF tuning. As a result, this unique construction allows manufacturing costs to be reduced while at the same time the highly desired characteristic of crystal frequency accuracy is still available.

A further object of the invention is to provide an ADF which requires a minimum of panel space for the control head and which is completely compatible in design and appearance with existing navigation and communication equipment.

A further object of the invention is to provide an ADF of the character described that requires a minimum of AC signals to be routed outside of the remote unit. An important feature of this invention resides in the audio gain control circuitry and in the loop slew control circuitry which has eliminated much heretofore needed cable space.

A still further object of the invention is to provide an ADF wherein its tuning range is accomplished by electronic band switching. It is an important feature of the invention that no mechanical band switching techniques are required.

Another object of this invention is to provide a uniquely constructed superior performance ADF having optimal signal to noise ratio and quick stabilized pointing characteristics. The invention utilizes an inverse servo damping feature in conjunction with diode switching techniques that are uniquely combined in ADF equipment.

A further object of the invention is to provide a uniquely constructed digital frequency discriminator which has particular utility in conjunction with an ADF utilizing a stabilized master oscillator for frequency synthesis.

A still further object of the invention is to provide in an ADF of the character described a unique high voltage phase detector which is operable to produce an output voltage whose signal is indicative of the phase difference between a reference signal and a variable signal.

A further object of the invention is to provide in an ADF using a stabilized master oscillator for frequency synthesis, a uniquely constructed variable frequency divider.

A further object of the invention is to provide in an ADF utilizing a stabilized master oscillator, a unique oscillator leveler circuit which maintains a constant oscillator signal level with low harmonic distortion.

A further object of this invention is to provide in an ADF using a stabilized master oscillator for frequency synthesis, a low pass filter for regulating the speed at which the closed loop response of the stabilized master oscillator operates as well as for providing conventional filtering functions.

Other and further objects and advantages of the invention, together with the features of novelty appurtenant thereto, will appear in the course of the following description.

DETAILED DESCRIPTION

In the accompanying drawings which form a part of the specification and are to be read in conjunction therewith, and in which like reference numerals indicate like parts in the various views;

FIG. 2a is a schematic diagram of the frequency discriminator circuit and the frequency drive circuitry;

FIG. 2b is an operations block diagram of the frequency discriminator shown in FIG. 2a;

FIG. 3a is a partial schematic diagram of the variable divider showing the AND gate circuitry used therein;

FIG. 3b to be placed above FIG. 3a for a completed schematic diagram;

FIG. 8 is a schematic circuit diagram of the electronic band switching circuitry and voltage control oscillator;

FIG. 9 is a schematic circuit diagram of the oscillator leveler;

FIG. 11 is a schematic diagram of the slew control circuit.

Figure 1A:
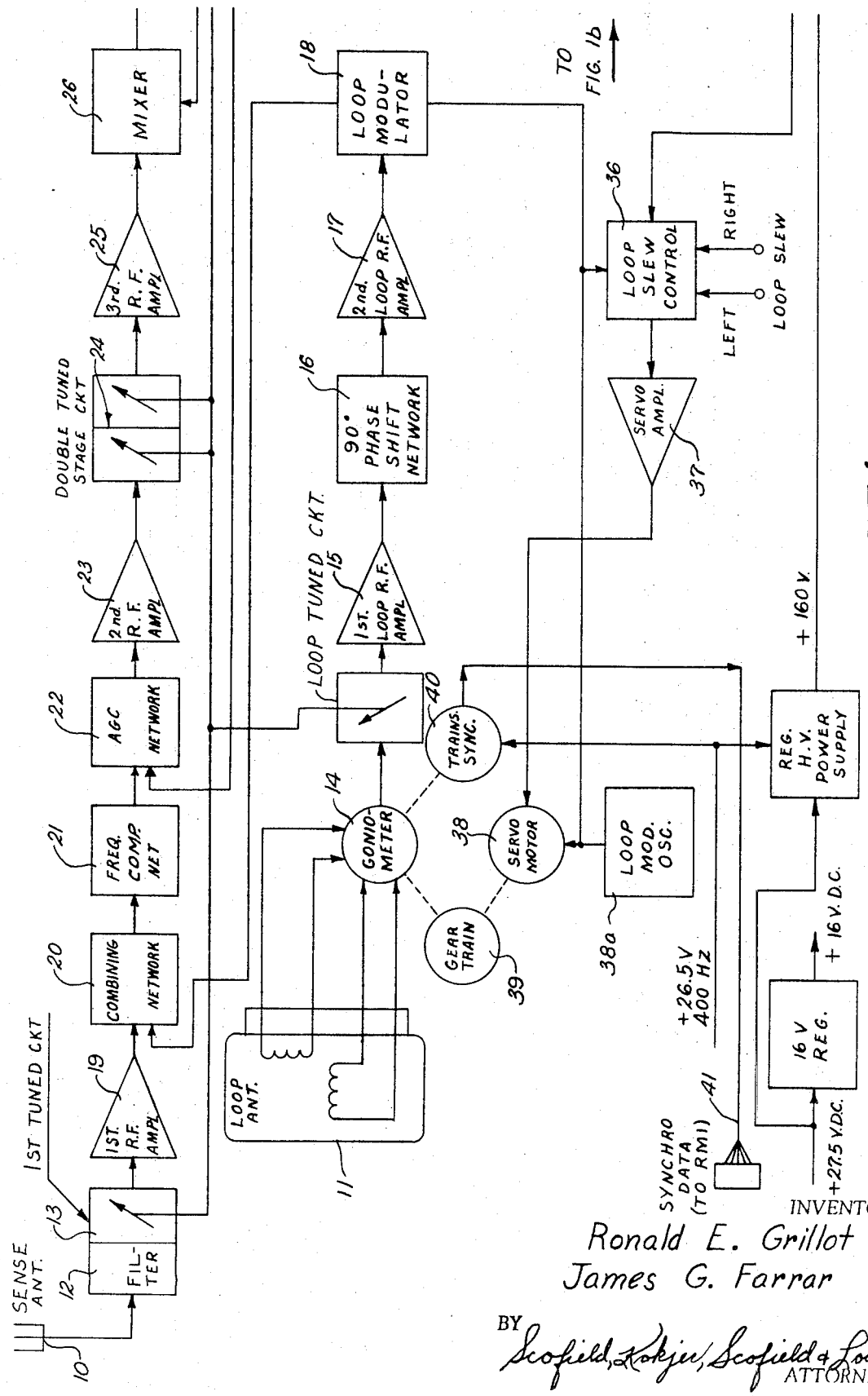
FIG. 1a is a partial block diagram of the crystal controlled ADF and is to be interconnected with FIG. 1b as shown thereon.
Figure 1B:
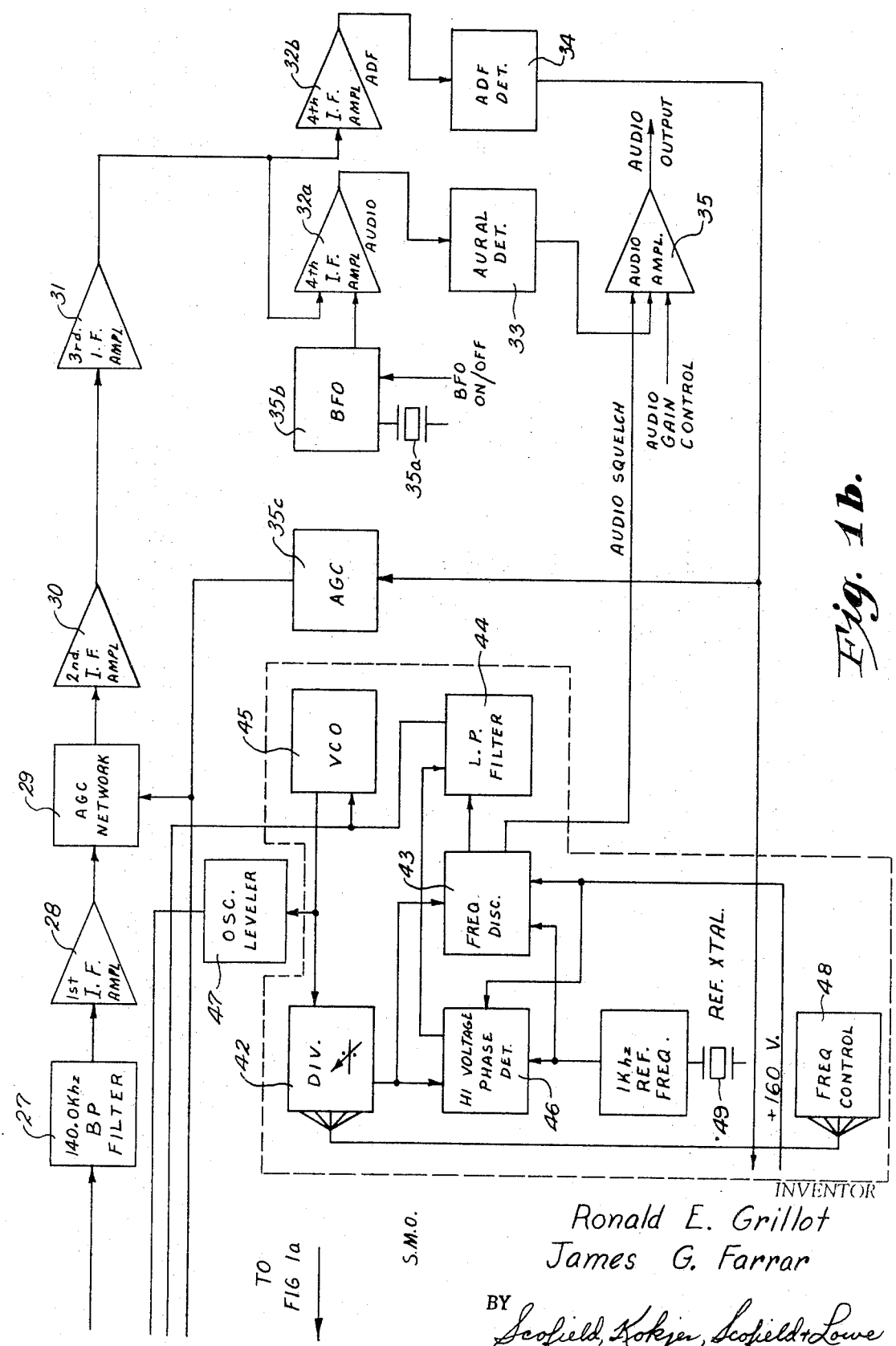
FIG. 1b is a partial block diagram of the remainder of the ADF not shown in FIG. 1a, and wherein the stabilized master oscillator is enclosed within the broken lines.

Referring now to the drawings and more particularly to FIGS. 1a and 1b, the ADF (Automatic Direction Finder) is disclosed in block diagram form. As suggested above, the subject ADF utilizes the conventional two antenna concept. Reference numeral 10 is used to indicate the sense antenna while the loop antenna is depicted at reference numeral 11. During conventional operation of the ADF, the pilot will select the frequency of the LF/MF (low frequency/medium frequency) Aeronautical Navigation Station by manually moving a frequency selector knob. Accordingly, the sense antenna and the loop antenna will sense the electric and magnetic fields respectively that the selected transmitting station emits.

The sense antenna signal, picked up by the sense antenna 10, is brought into the receiver and applied to a first tuned circuit 13 through a rejection filter 12. Similarly, the signal picked up by the loop antenna 11 is transmitted to Goniometer 14 and then into the first loop RF amplifier 15.

Due to the nature of a loop antenna (primarily a differentiating device), the loop signal is shifted in phase 90° and is applied to the loop amplifier 15. A phase shift network is indicated by the numeral 16 and may be thought of as being located between the first loop RF amplifier 15 and a second loop RF amplifier 17 to compensate for the above-mentioned 90° phase shift. The output from the second loop RF amplifier is then applied to loop modulator 18 which changes the phase of the RF signal from amplifier 17 in 180° increments at an audio rate.

The sense signal and the modulated loop signal are combined in combining network 20 after the sense signal has been amplified by a first RF amplifier 19 which receives the signal from the first tuned circuit 13 in the sense channel. The modulating of the signal in loop modulator 18, which results in the changing of the phase of the loop antenna signal in 180° increments, causes the sense signal to algebraically add with the loop signal during one phase increment and to subtract from the loop signal during the next 180° increment in the combining network 20. It should be noted that the presence of a signal from the loop antenna circuitry indicates the rotor of the Goniometer has not yet nulled out and therefore is not pointing to or toward the desired station. The combined signal out of the combining network 20 is delivered next to the frequency compensating network 21. This compensating network has no direct effect on the operation of the receiver, yet it plays an important role with respect to the performance specification of same.

Frequency compensation network 21 is used to compensate out particular frequency response characteristics of the transformers which are used in the RF circuitry of the ADF. The signal from the output of frequency compensation network 21 is then fed to AGC network 22. AGC 22 helps control the amplitude of the signal being fed into the following stages of the ADF, since the signal strength will either increase or decrease in strength as the aircraft respectively approaches or departs from the vicinity of the transmitter.

The signal out of AGC network 22 is delivered to RF amplifier 23. This amplifier provides voltage gain and a means for delivering energy into the double tuned stage identified by the numeral 24. Double tuned stage 24 provides increased image rejection in the ADF receiver. The signal out of double tuned stage 24 is applied to RF amplifier 25. This amplifier (25) provides a means for transferring voltage at a high impedance to a lower impedance level and provides voltage gain. The output of the amplifier 25 is then applied into the mixer circuitry 26. The mixer circuitry combines the inputs from the crystal controlled oscillator circuitry with the signal derived from combining the sense and loop signals from the ground station. The output of the mixer is the intermediate frequency (IF) signal produced in the mixing process. The crystal controlled oscillator or stabilized master oscillator (SMO) will be discussed in more detail later, however, it is generally activated by the pilot manually turning the selector knobs on the ADF frequency control head 48. As the pilot selects his desired frequency, the stabilized master oscillator system operates to produce the appropriate signal from a single reference crystal.

The output from mixer 26 is delivered to a 140 kilohertz band pass filter 27, passes through same and is then applied to the input of a first IF amplifier 28. The output from IF amplifier 28 is applied to AGC network 29, a second IF amplifier 30, a third IF amplifier 31, and then to dual fourth amplifier stages identified by the numerals 32a and 32b. The signal from mixer 26, filtered through the 140 kilohertz band pass filter 27, has its level significantly increased by the various amplification stages discussed above.

The output of each dual fourth stage amplifier is used to drive an associated detector. For example, the output of IF amplifier 32a drives the aural detector 33, while the output of IF amplifier 32b drives the ADF detector 34. The signal in IF amplifier 32a may be combined with the signal from beat frequency oscillator (BFO) 35b which is controlled by crystal 35a as needed. The output from aural detector 33 is then delivered to audio amplifier 35. Additional inputs to the amplifier 35 include an audio gain control and an audio squelch signal from the stabilized master oscillator circuitry. These three parameters result in the output of audio amplifier 35 to the conventional headset being optimalized for the benefit of the pilot. The signal from IF amplifier 32b is detected in ADF detector 34 and is used to provide drive to AGC network 35c and the loop slew control network 36.

As mentioned above, the modulation produced in combining network 20 is present in the fourth IF amplifier 32b. This modulation will be detected by ADF detector 34 producing the envelope corresponding to the switching rate of the loop modulator. The "envelope" signal is then fed to loop slew control network 36 which, absent the operation of a manual means for causing the ADF pointer to rotate either right or left, will pass the signal into servo amplifier 37. This amplifier provides voltage and power gain to the detected signal as it is applied to servo motor 38. The amplified envelope signal input into the appropriate windings of servo motor 38 will cause the device to begin rotation. Gear train 39 translates the rotation of servo motor 38 to the rotor of Goniometer 14.

The Goniometer rotor will continue to turn to a position wherein the plane of the winding of the rotor of the Goniometer 14 is parallel to the lines of flux produced therein. When the rotor is in this parallel condition, there is no signal induced in the rotor and therefore no signal out of loop modulator 18. With no modulated signal appearing at the combining network 20, there is, as a result, none recovered by ADF detector 34 and therefore no signal input to servo amplifier 37 or any further rotation of servo motor 38. With the rotor of Goniometer 14 in the nulled position, this relative position is transmitted to the cockpit by the way of a standard transmitting synchro 40. This synchro data may be further transmitted to the RMI via line 41.

In addition to the various portions of the block diagram discussed above, conventional regulated high voltage power supply and 16 volt regulated lines are available therein.

The stabilized master oscillator circuitry (SMO) makes possible the use of one crystal reference to produce numerous crystal controlled frequencies (1500 channels) by changing the division ratio of a variable divider. Thus the stabilized master oscillator operates in conjunction with the frequency control head to produce the proper signal output therefrom to mixer 26.

For example, upon selecting the desired frequency in the frequency control head, a frequency output from the variable divider 42 is transmitted to frequency discriminator 43 where a comparison is made to determine if the divided output from divider 42 is indeed on the exact selected frequency. The frequency discriminator 43 includes a high and a low channel whose operative effect is to have the high channel produce an output if the frequency divided signal is high in reference to the crystal controlled reference frequency and similarly to have the low channel produce an output if the frequency divided signal is low with reference to the crystal controlled reference frequency. Assume that the divided frequency from the variable divider is somewhat greater than the crystal controlled reference frequency. This will be detected in the high channel of frequency discriminator 43 and an output will be produced to indicate this condition. The output from the high channel of frequency discriminator 43 is fed to the "drive low" circuit whose output is then fed to the voltage control oscillator 45 through a low pass filter 44. A "drive low" circuit in conjunction with the output from frequency discriminator 43, which will be discussed in more detail later, has the effect of reducing the tuning voltage to voltage control oscillator 45.

As the voltage to VCO 45 is reduced, the frequency from the VCO is reduced as is the divided frequency from variable divider 42. This reduction of divided frequency eventually reaches the point where the divided VCO frequency is nearly equal to the crystal controlled reference frequency. At this point, phase detector 46 assumes control of the tuning voltage to VCO 45 and synchronizes the divided frequency with the reference frequency. When this occurs, neither the high nor low channel produces an output.

The output of phase detector 46 is a variable duty cycle square wave. The phase detector operates to automatically adjust the duty cycle of its output so that the average DC value thereof will be the value required to keep the VCO in exact synchronism with the crystal controlled reference. If, for example, the VCO 45 begins to drop slightly in frequency, the average duty cycle of the square wave will become slightly higher (increasing the average DC voltage) thus causing the resonant frequency of the VCO to become slightly higher and to return to the correct value. When the VCO begins to run at too high a frequency, the duty cycle of the output of the phase detector begins to decrease slightly causing the tuning voltage to decrease a proportionate amount, thereby reducing the resonant frequency of the VCO to maintain frequency synchronism. The output from the frequency discriminator and phase detector will contain AC components which are removed by the low pass filter to provide a relative constant DC tuning voltage for the VCO and the other RF circuitry disclosed therein.

FREQUENCY DISCRIMINATOR

Figures 2A, 2B:
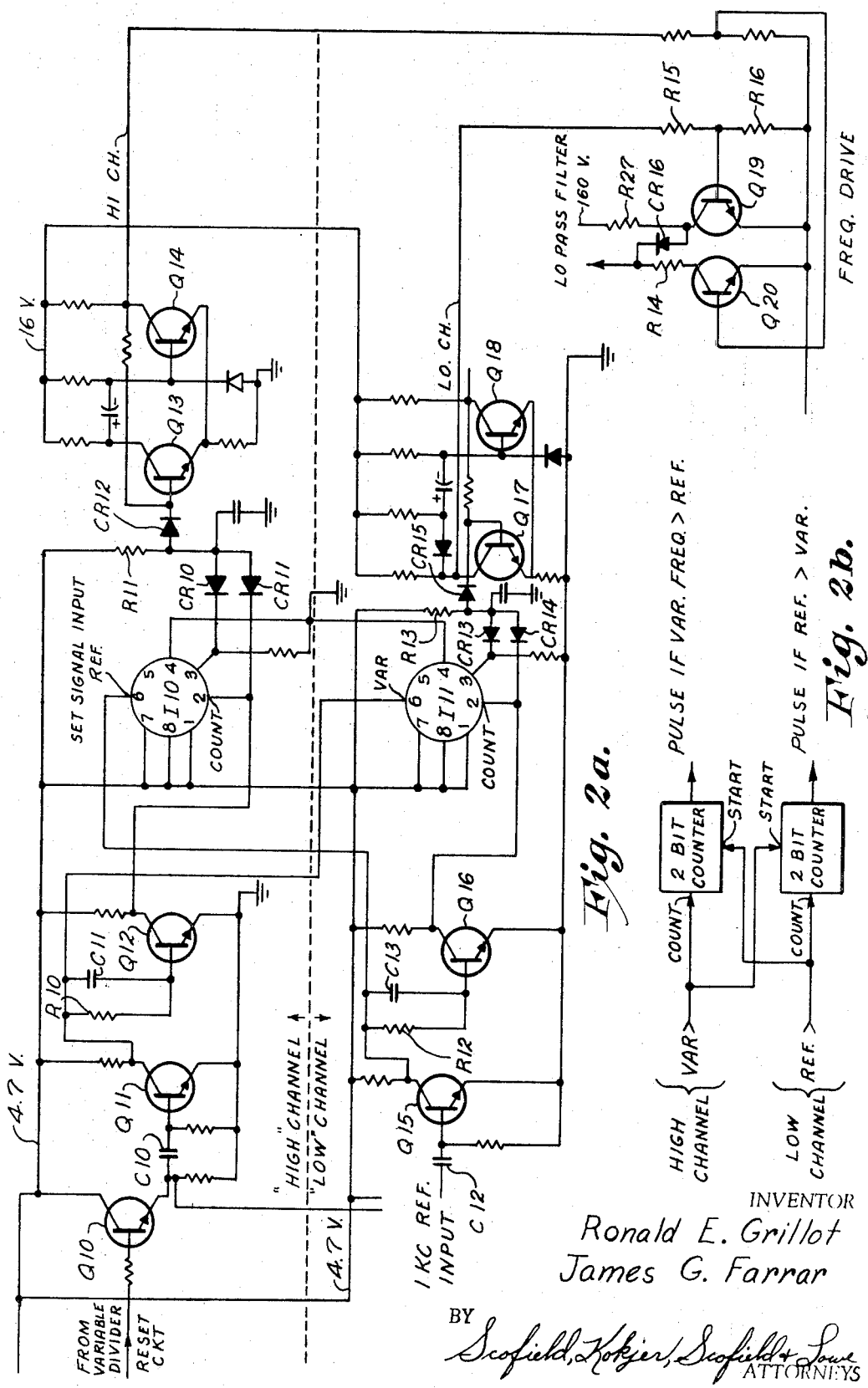

Turning now to the details of the stabilized master oscillator system and more particularly to frequency discriminator 43, see FIGS. 2a and 2b. Frequency discriminator 43 is used to compare the frequency of two signals, one being a reference signal and one being a variable signal. The frequency discriminator is required to indicate three conditions: (1) a high condition when the variable frequency is above the reference frequency; (2) a low condition when the variable frequency is below the reference frequency; and (3) an "ON frequency" condition when the two signals are identical in frequency.

The conventional or prior art frequency discriminator usually had an output which would be proportional to the frequency difference of the variable frequency when compared with the reference frequency. It was difficult to distinguish the ON frequency condition from a marginal high or marginal low frequency condition. The more sophisticated use of frequency discriminators requires the output of same to indicate a definite high frequency condition or a definite low frequency condition and that no output be present when the two frequencies are identical. With such a discriminator, the high or low output conditions from same can be used as correction signals to other circuitry such as voltage control oscillator 45.

As suggested above, the output of voltage control oscillator 45 is applied through oscillator leveler 47 to mixer 26. When the desired frequency is selected in frequency control head 48, the signal presently being generated by VCO 45 is then divided by a new number in variable divider 42 which is correlated to the new frequency selected. The divided frequency output (variable frequency) of the frequency divider is now compared in the frequency discriminator to determine if the divided output is indeed on the exact selected crystal controlled frequency. Of course, this variable frequency is directly related to the VCO frequency in that it is equal to the VCO frequency divided by the number set by frequency control head 48.

As seen in FIG. 2a, the frequency discriminator includes a "high" channel and a "low" channel. Each channel is made up of a pulse shaping network, a counter, an AND gate and a final pulse shaping network discussed later in more detail. The purpose of the input pulse shaping network is to provide drive for the frequency counter and also reset drive for the opposite channel. The counter in each channel of the frequency discriminator counts the number of pulses coming from its pulse shaping network. The output of the counter, when ANDED, is then fed to the final pulse shaping network to provide a pulse for the "frequency drive" portion of the frequency discriminator which also will be discussed later in more detail.

Looking initially at the high channel construction and operation thereof, and assuming that the variable frequency is greater than the reference frequency, the pulses coming to the high channel from the reset circuitry (discussed infra) of variable divider 42 are applied to the base of transistor Q–10. Transisor Q–10 is capacitively coupled by capacitor C–10 to the first transistor amplifier Q–11 in the pulse shaping network. The output of Q–11 is taken from its collector and applied to the resistor-capacitor network comprised of capacitor C–11 and resistor R–10. This network then interconnects the output signal to the base of transistor Q–12 which completes the first pulse shaping network in the high channel of the frequency discriminator.

The output of Q–12 (from its collector terminal) is delivered to pin No. 2 of a counting circuit identified by the numeral I–10. The counter used in the subject circuit may be commercially obtained from various manufacturers, however, we have found that a conventional eight pin integrated circuit (manufactured by Transitron and identified by their Model Number TFF 3131) which functions as a two bit counter is satisfactory. Pin 2 of the counter I–10 may be conveniently thought of as the count terminal such as that disclosed in FIG. 2b. The output from the collector of Q–12 is also applied to an AND gate comprising diodes CR–10, CR–11 and resistor R–11. The second input to this AND gate is taken from the output of counter I–10 at pin No. 3.

At the beginning of each count cycle, the reference frequency input to the frequency discriminator (the 1 kHz. reference frequency) will set counter I–10 to zero by applying the 1 kHz. reference input through transistor Q–15 (taking the output from the collector of same) to pin No. 6 of counter I–10. The signal on pin 6 causes pin 3 of counter I–10 to have a low voltage condition thereon. The first pulse coming in from the variable divider through the pulse shaping network (Q–11, Q–12) to pin 2 will cause the voltage on pin 3 to rise. The second pulse coming into pin 2 from the pulse shaping network will be ANDED with the already high voltage on pin 3 thereby resulting in the AND gate producing an output pulse to the second pulse shaping network in the high channel.

The above-mentioned pulse from the AND gate is initially transmitted through diode CR–12 to the base of of transistor Q–13. Transistors Q–13 and Q–14 are combined to form a conventional one shot monostable circuit (or second pulse shaping network as mentioned above). The output of this one shot is taken from the collector of Q–14 and is delivered to the "drive low" portion of the frequency drive circuitry (shown in the lower right hand portion of FIG. 2a) discussed infra. This output from the high channel indicates that the VCO 45 is "running" above crystal controlled frequency (e.g. the variable frequency exceeds the reference frequency, see FIG. 2b) and the "drive low" circuitry will provide a correction voltage to the VCO for the purpose of reducing the frequency of same.

The "low" channel operates to count the pulses from the reference (1 kHz.) signal and if an output is obtained, then to operate the "drive high" portion of the frequency drive circuitry to correct VCO 45 in an opposite manner. The input to the "low" channel from the 1 kHz. reference signal is through capacitor C–12 to the base of transistor Q–15 and from thence through the resistor-capacitor combination R–12 and C–13, respectively to the base of transistor Q–16. Transistors Q–15 and Q–16 operate in a similar manner to transistors Q–11 and Q–12, as discussed above, and further shape the pulse for counting purposes.

The output from the collector of transistor Q–16 is delivered to the count terminal (pin 2) of a second two bit counter integrated circuit identified by the numeral I–11. This circuit is identical to the integrated circuit I–10 discussed above with reference to the "high" channel operation. The shaped output (from Q–16) is also applied to one terminal of the AND gate which is comprised of diodes CR–13, CR–14 and resistor R–13.

The start terminal (pin 6) of counter I–11 is activated by the variable frequency pulses emanating from the collector of transistor Q–11 (located in the high channel). These pulses appearing at the start terminal "set" the counter to Zero, thereby allowing the reference pulses to be counted.

The second input to the "low" channel AND gate is taken from the output of counter I–11 at pin 3. The two inputs to this AND gate then produce an output pulse which is fed through diode CR–15 to the conventional one shot monostable circuit comprising transistors Q–17 and Q–18 (second shaping circuit in "low" channel). It should be noted that this one shot in the "low" channel is slightly different from the one shot in the "high" channel in that the output from the Q–17, Q–18 circuit is taken from the collector of transistor Q–17 and directed to the drive high portion of the frequency drive circuitry. In this manner the phase of the output from the low channel is opposite or 180° out of phase from the output of the high channel. Accordingly, the collector voltage of transistor Q–18 will be pulled to a low potential while the collector of Q–17 is raised to a high potential.

The frequency drive circuitry includes transistors Q–19 and Q–20, diode CR–16 and resistors R–14 and R–27. The output from the frequency drive circuitry is taken at the junction of diode CR–16 and resistor R–14, and is deliverable to low pass filter 44. Assuming that the "low" channel produces an output (Q–17 turns on), the resulting "drive high" input then causes transistor Q–19 to be turned off. This allows current to flow through resistor R–27 and diode CR–16 (previously Q–19 diverted current from CR–16 to ground) into the low pass filter 44 which raises the voltage out of the filter and causes the frequency of VCO 45 to be increased. Under normal conditions, transistor Q–19 is biased with the dividing resistors R–15 and R–16 such that the transistor is turned on when there is no input to the circuit.

The "drive low" input to the frequency drive circuitry is taken from the high channel of the frequency discriminator (collector of Q–14) and is applied to the base of transistor Q–20 thereby turning on same. Current is now drained through resistor R–14 and Q–20 from the low pass filter, thus reducing the voltage at the filter output. As the output voltage of low pass filter 44 decreases, the reduced voltage is transferred to the VCO 45 thereby reducing the frequency of the VCO.

HIGH VOLTAGE PHASE DETECTOR

The above-mentioned frequency discriminator is used to provide information to VCO 45 concerning the relative frequencies. If the VCO is running above or below frequency, the outputs of freqeuncy discriminator 43 will be utilized to bring the VCO near its correct frequency. It is, however, necessary to maintain VCO 45 on the exact selected frequency. This is not possible by using frequency discriminators alone and requires additional information that can be provided by the now to be described phase detector.

The phase detector is required to have a sufficient output voltage range so that it may tune VCO over the complete range of the VCO's frequency. In other words, the phase detector output must vary from approximately 10 to 110 volts on the average.

The subject high voltage phase detector is utilized, in part, because it obviates the use of normally required DC amplifiers which heretofore provided the required voltage range. Due to the difficulty in designing a DC amplifier that could operably produce the above-mentioned range, a substantially different type of phase detector was needed. The subject phase detector can produce the required tuning range with the minimum amount of circuitry and eliminate the inherent stability problems commonly associated with DC amplifiers.

Figure 4:
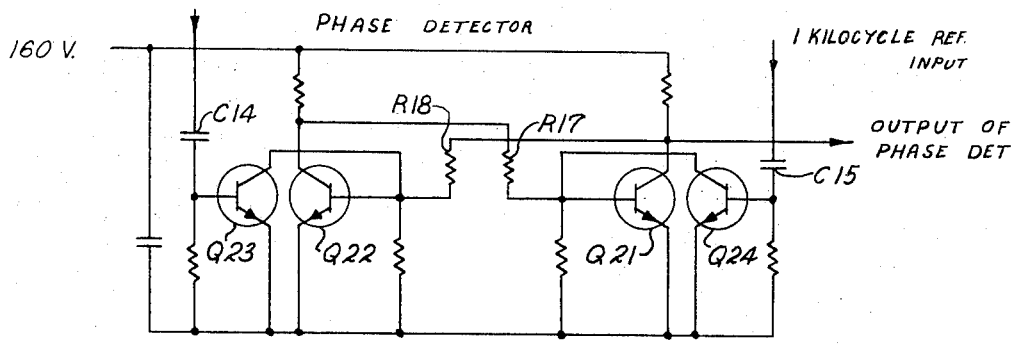
FIG. 4 is a circuit diagram of the phase detector.

The inputs to the phase detector are the variable signal from variable divider 42, the reference signal (the 1 kHz. signal) and the high voltage or 160 volt line (see FIG. 4). The output of the phase detector is a pulse wave having a variable duty cycle. The average DC voltage of this signal is capable of maintaining the VCO on an exact multiple of the reference frequency. To further assist in controlling VCO 45, the output of the high voltage phase detector has a later discussed low pass filter 44 located intermediate of the phase detector and VCO 45 to eliminate nearly all of the residual AC signal.

Turning now to the details of the phase detector circuitry, two high voltage transistors, Q–21 and Q–22, are connected in the usual fashion to provide a bistable flip-flop, however they operate from an unusually high voltage of 160 volts. Two additional transistors Q–23 and Q–24 are added to the circuitry and used as setting and resetting transistors for the high voltage flip-flop. The circuit is connected so that the collector of Q–23 is connected to the base of Q-22 and the collector of Q-24 is connected to the base of Q-21. The output of the high voltage flip-flop is taken from the collector of Q-21.

The variable frequency signal from variable divider 42 is applied to the base of transistor Q-23 and the reference 1 kHz. signal is applied to the base of Q-24 as shown in FIG. 4.

A pulse coming in from the variable frequency input will be transmitted through capacitor C-14 to the base of transistor Q-23. This pulse will turn Q-23 on, conducting current through its collector and grounding the base of Q-22. The grounding of the base of Q-22 turns this transistor off and its collector voltage will begin to rise and approach the power supply level (160 volts). As the collector voltage rises, a DC current will be provided through resistor R-17 which will now turn on transistor Q-21. When Q-21 turns on this sharply reduces its collector voltage to a low value and removes the bias voltage from Q-22. The phase detector will now stay in this state until a pulse comes in to the reference input.

A reference input signal will be transmitted through capacitor C-15 to the base of transistor Q-24. This pulse causes Q-24 to conduct and to ground the base of transistor Q-21. With the base of transistor Q-21 grounded, the collector voltage of transistor Q-21 will rapidly increase and provide a DC current through resistor R-18 to the base of transistor Q-22 thereby turning on same. The phase detector will now remain in this state until a pulse comes into the variable input.

The output of the phase detector will approximate a variable duty cycle square wave having a high voltage level of approximately 160 volts and a low voltage level near ground. The duty cycle of the square wave will automatically be adjusted so that the average DC value will be the value required to keep VCO 45 in exact synchronism with the crystal control reference frequency. This is true because as VCO 45 begins to drop slightly in frequency, the average duty cycle of the output of the phase detector will become slightly higher and therefore the average DC voltage will become slightly higher. Thus the capacitance of the voltage variable capacitor (discussed later) in the VCO is decreased slightly thereby causing the resonant frequency of same to become slightly higher thereby returning to its correct value. In case VCO 45 begins to run slightly higher in frequency, the duty cycle of the output of phase detector 46 will decrease slightly causing the VCO tuning voltage to likewise decrease in a proportionate amount. This increases the capacitance of the voltage variable capacitor in the VCO and reduces the frequency to an amount required to maintain frequency synchronism.

ONE KILOHERTZ REFERENCE FREQUENCY

Figure 6:
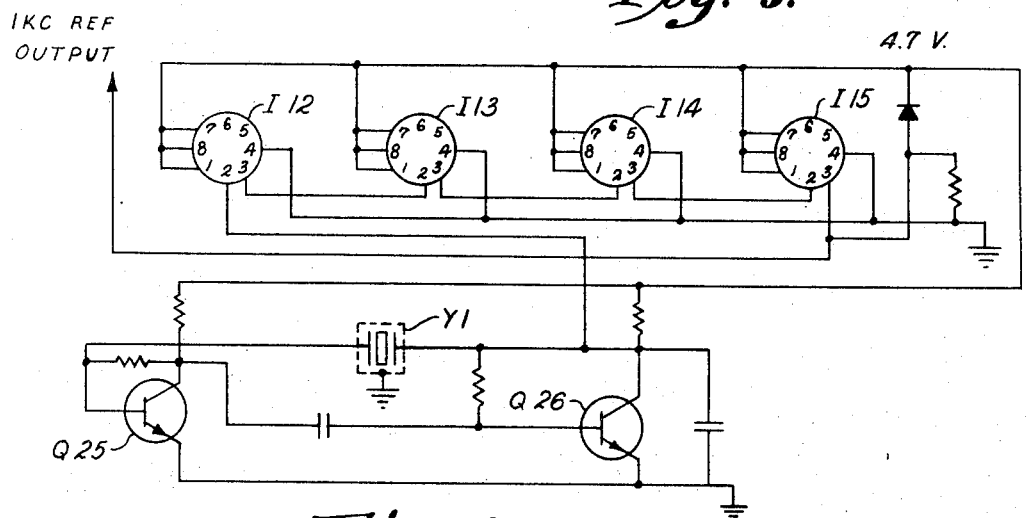
FIG. 6 is a schematic diagram of the reference frequency oscillator.

As set forth above, the divided frequency from VCO 45 is compared with a crystal standard frequency. The standard frequency is required to be very precise, stable and accurate. The reference frequency oscillator and related circuitry are shown in FIG. 6. The crystal used therein is designated by the numeral Y-1 and has a frequency of 16 kHz. Since the actual comparison frequency is 1 kHz., it is necessary to divide the 16 kHz. crystal oscillator output by the number 16. The following description relates to the crystal oscillator and the dividing circuitry.

The reference oscillator is comprised of transistors Q-25 and Q-26 and the 16 kHz. crystal Y-1 which is arranged in a conventional manner to produce a sawtooth output wave on the collector terminal of Q-26. This sawtooth wave, having an oscillatory frequency of 16 kHz., is fed to pin 2 of the first flip-flop identified by the numeral I-12. It has been found that the shape of the sawtooth wave facilitates optimum operation of the flip-flop I-12.

Flip-flop I-12 (a conventional integrated circuit flip-flop having a total of 8 pins and substantially identical to flip-flops I-13, I-14 and I-15) divides the 16 kHz. signal to 8 kHz. The output, taken from pin 3 of flip-flop I-12, is delivered to the input pin 2 of the adjacent flip-flop I-13. I-13 divides the 8 kHz. signal by 2, thereby delivering a 4 kHz. signal from its pin 3 to pin 2 of flip-flop I-14. I-14 continues the division of the reference signal to 2 kHz. and supplies same to pin 2 of flip-flop I-15 which provides the final division, thereby producing an output of 1 kHz. This comparison frequency signal (1 kHz.) is delivered to both high voltage phase detector 46 and frequency discriminator 43.

VARIABLE DIVIDER

Variable divider 42 operates to divide the existing signal presently transmitted by VCO 45 by a number which corresponds to a frequency set by frequency control head 48. This divided frequency is then transmitted to high voltage phase detector 46 and to frequency discriminator 43 where it is acted upon in the manner described above.

Figure 3B:
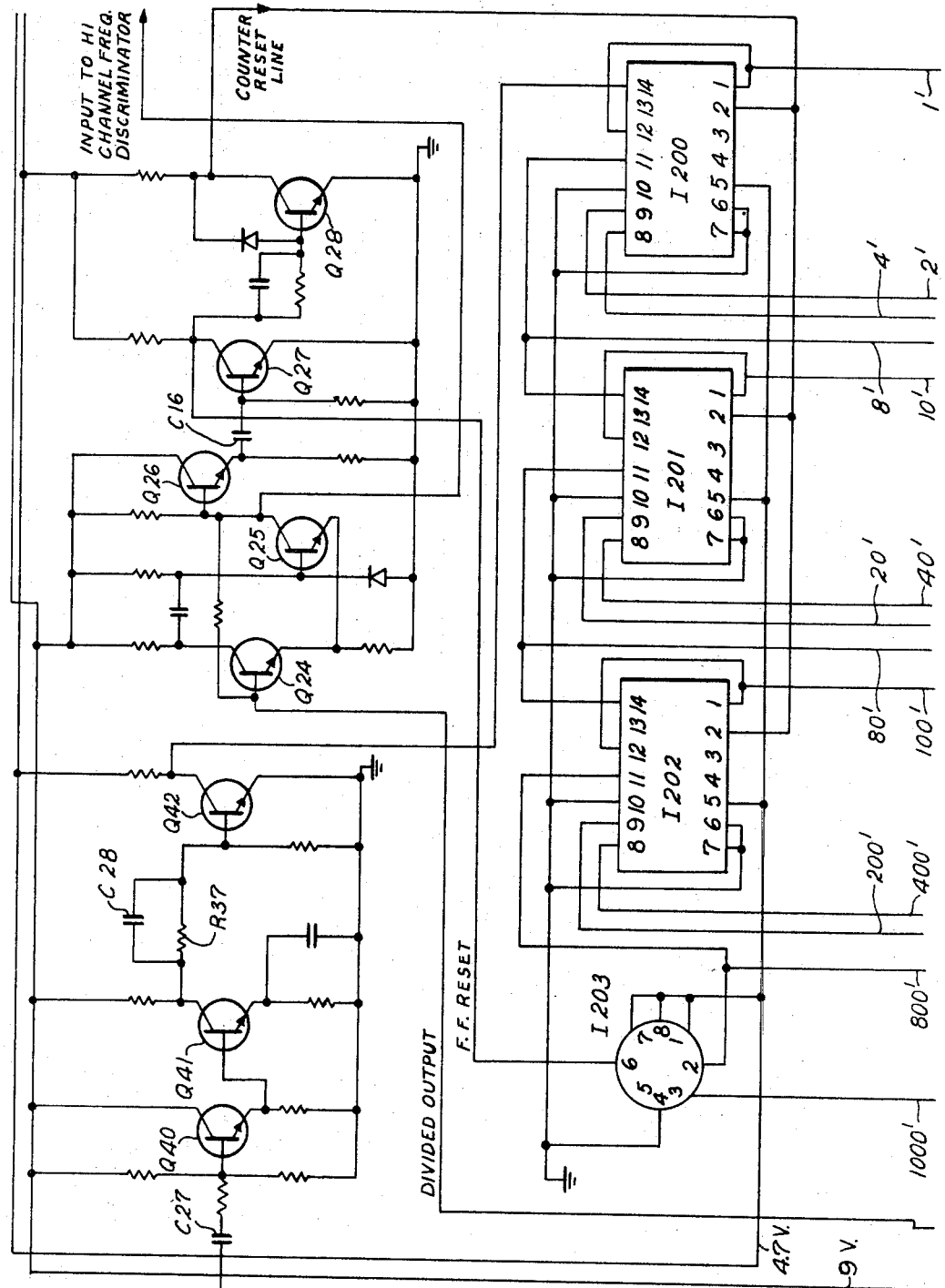
FIG. 3b is a partial schematic diagram of the variable divider showing the counters and pulse shaping and reset circuitry utilized therewith.

A brief summary of the operation of the variable divider may be understood by considering that the variable divider shown in FIGS. 3a and 3b may be broken up into the following main sections: (1) a pulse shaping network; (2) reset circuitry; (3) counting circuitry including decade counters and a flip flop; and (4) the AND gate circuitry.

The input from the VCO is fed initially to the pulse shaping circuitry through capacitor C-27 to the base of an impedance amplifier Q-40. The output of Q-40 (from the emitter) provides power gain to produce a square wave at the collector of Q-41. The collector signal is shaped through the RC network R-37 and C-28 and amplified by Q-42, thereby feeding a shaped input to the first counter I-200. The first counter I-200 counts 10 pulses and delivers an output to second decade counter I-201 which after counting 10 pulses will in turn feed a pulse to the third decade counter I-202. After the third decade counter I-202 receives 10 pulses it in turn supplies a pulse to its associated flip-flop I-203. It should be pointed out that the counters will not necessarily count through their complete capacity because of the interconnecting AND gate and reset circuitry. The control wires on the AND gate may be selectively set to a desired number by frequency control head 48. The series of pulses coming into the decade counter will provide a pulse output from the AND gate when that number of pulses reaches the number set on the AND gate control wires. The AND gate output pulse will be delivered to the reset circuitry and to the high channel (also eventually to the low channel) of the frequency discriminator. The reset circuitry acts to set all the decade counters back to the zero state. The pulse from the AND gate is also shaped and then delivered to the high channel of the frequency discriminator for comparison with the reference frequency. This pulse occurs at a frequency which is equal to the frequency of the VCO divided by the selected number.

Turning initially to a more detailed description of the operation of the AND gate (see FIG. 3a), the gate has a total of 13 inputs, 12 from the decade counters (I-200, I-201 and I-202) and one from the integrated circuit flip-flop (I-203). The 13 individual inputs to the AND gate and each section of the gate associated therewith are all identical. As a result, an explanation of the operation and construction of one of the sections of the gate will be sufficient for a complete understanding of the entire construction and operation of same.

In operation, an individual section of the AND gate is activated by the grounding of an appropriate wire associated therewith. The AND gate then functions to provide an output when the inputs corresponding to the same sections are all at a high relative voltage level.

The control inputs to the AND gate may be defined as inputs from the frequency control head 48 and are essentially made up of 13 wires. These 13 wires may or may not be grounded in any combination depending upon the manual operation of the control head. For purposes of identification, the control inputs to the AND gate are identified with a numeral that corresponds to the inputs from the decade counters. For example, the control inputs (wires) which correlate to the first decade counter will be identified with the numerals 1, 8, 2 and 4. These numerals are found on the lower right-hand portion of a control wire identification strip shown in FIG. 3a. The upper right-hand portion of the AND gate is numbered 1′, 8′, 4′ and 2′, to specify and identify the inputs (wires) that connect each section of the AND gate with the first decade counter I–200. The remaining control inputs and decade inputs are similarly related and identified with the numerals 10, 80, 20 and 40 relating to the next sequential control wires and the numerals 100, 800, 200 and 400, relating to the third set of wires, and finally the numeral 1000 relating ot the fourth and final control wire. Likewise, decade counter inputs from I–201 are sequentially identified by the numerals 10′, 80′, 20′ and 40′, etc.

In order to easily understand how the control inputs operate to control the operation of the counters and the AND gate, consider initially the control inputs for decade counter I–200 which are identified by the numerals 1, 8, 2 and 4. For example, if it is desired to utilize the "divide by 2" output of the decade counter, the 2 control wire will be grounded in the AND gate by operation of the control head. In this condition, the 1′, 8′ and 4′ input wires from the decade counter will be ignored since the 1, 8 and 4 control input wires were not grounded. The same applied to the 10, 80, 20 and 40 sections and also to the 100, 800, 200, 400 and 1000 sections. The resulting "divide ratios" provided by the decade counters and flip-flop I–203 will be the sum of the symbolic numbered control wires which have a ground condition applied to them. For example, if the 1, 2, 10, 100 and 1000 wires are grounded, the divide ratio would be the sum of the number 1+2+0+100+1000 or 1,113.

As suggested above, the AND gate is made up of a plurality of sections which are identical in construction and operation. As a result, the detailed description of the AND gate may be limited to a single section with the understanding that the other sections operate identically. In the following discussion, the voltage levels will be referred to as being either high or low. In such a situation, the low level corresponds to the low voltage condition from the respective decade counter and the high level corresponds to the high voltage level condition from the decade counter. It is these relative levels that are the only parameters required for the operation of the AND gate.

The AND gate may be discussed in detail by observing the section enclosed within the broken lines and associated with the 10′ output from decade counter I–201. The two control conditions affecting this particular section are (1) when control wire 10 is grounded and (2) when control wire 10 is ungrounded. It is assumed all other control wires on the AND gate are not grounded for the purpose of this discussion.

The output from the AND gate is delivered to wire 0 which also has a nine volt positive bias supplied thereto through resistor R–19. When the 10 control wire is not grounded, a voltage is provided for diode CR–16 by the voltage divider resistor combination R–20 and R–21 which is connected across the above-mentioned nine volt supply. This resistive divider voltage applied to the anode of CR–16 results in a high condition (as opposed to ground) on the 10 control wire. As a result, diode CR–17 which is coupled to the 10 output from decade counter I–201 via line 10′ is reverse biased.

Since the output of decade counter I–201 has its 10 output decoupled from the AND gate by CR–17 (diode CR–17 is reverse biased) there will be no contribution by the 10′ output from counter I–201 to the same gate. It follows that the operation of the AND gate is such that a particular section is activated when its respective control wire is grounded, however, the input from the decade counter must be high at the same time in order for the AND gate to have an output. Fore example, if the 10 control wire and 100 control wire were grounded, there would be an output from the AND gate only when the output on the 10′ counter wire and the 100′ counter wire are high and simultaneously occurring. When the output on the 10′ wire is high and the 100′ wire is low, there would be no output. The output occurs only when inputs from their counters are high and simultaneously occurring with a ground condition on their respective control wires. This is true for other combinations.

The manner in which the AND gates cooperate with the control wire and counters will now be discussed. When decade counter I–201 causes an output for the 10 section of the AND gate, it will be transmitted through diode CR–17 and back to the output of the AND gate (line 0) through diode CR–18. Diode CR–18 is maintained at a low condition by current flowing through same and resistor R–22 to ground. When the output on the corresponding decade counter wire (10′) goes high, current will flow through diode CR–17 and resistor R–22 to ground, thus raising the voltage at the junction of the two diodes CR–17 and CR–18. Since the voltage at this junction is raised, there will be no current flowing through diode CR–18 as it is back biased and the output of the AND gate (on line 0) will rise to the level of the output of the decade counter.

It follows that the AND gate has a plurality of sections, each section being operable to produce an output on the output line (line 0) of the AND gatee provided certain conditions are present. The following are conditions which will allow an output to be present: (1) if the sections which have control wires grounded *all* have a corresponding high input from their respective counters; and (2) if only one section of the AND gate has its control wire grounded, and its input from its respective decade counter high. However, if, for example, the 10 section and the 100 section have their control wire grounded and only the 10′ wire from its decade counter has a high input, to its respective section, the output line 0 of the AND gate will not have an output thereon because the 100 section operates to ground the output normally produced by the 10 section. Thus, a ground on the 10 control wire and the high level from its respective counter will produce an output to output line 0 as discussed above, but the ground condition on the 100 control wire removes the back bias from CR–26 and resistor R–36.

Diode CR–27 (and other similarly connected diodes in the AND gate) of the 40 section will not ground the output pulse from the 10 section absent a ground on the 40 control wire, because there is a back bias condition on diode CR–27. This prevents an output pulse from the 10 section (or other sections) from passing therethrough to ground.

When conditions are such that an output appears on line 0 of the AND gate it is delivered to the base of an impedance amplifier Q–25. This amplifier provides additional drive capability to the circuitry that is immediately connected therewith.

The divided output which appears on the AND gate output line and amplified by impedance amplifier Q–25 is sent to the reset circuitry which includes pulse shaping and amplifying circuitry. For example, the divided output is initially sent to the base of transistor Q–24 which along with transistor Q–25 forms a conventional one-shot monostable. The voltage on the collector of transistor Q–25 is the input signal to the high channel of the frequency discriminator and is the VCO signal divided by the number set in the AND gate and shaped through the above-mentioned one-shot monostable. It should be pointed out that this divided signal is also sent to the high voltage phase detector 46 through the transistor follower in the frequency discriminator Q–10.

Transistor Q–26 is used as an emitter follower and applies the divided signal through capacitor C–16 to the base of transistor Q–27. The positive going portion of the divided output signal turns on transistor Q–27. When transistor Q–27 turns on, the collector voltage on same drops sufficiently to turn transistor Q–28 off, thereby increasing its collector voltage and forming a positive pulse on the counter reset line.

As the decade counter goes through one counting cycle, and a pulse appears at the output of the AND gate, the pulse shaping circuitry and the pulse on the counter reset line resets the decade counters to the starting condition and the count cycle may be repeated again. This reset pulse appears simultaneously on pin member 2 of all three decade counters as shown in FIG. 3b. The flip-flop I–203 is likewise reset by the pulses taken from the collector of transistor Q–27 and applied to pin 6. Due to the different reset conditions on the decade counters and the flip-flop, the reset pulses are taken from two different transistors, Q–28 and Q–27, respectively.

LOW PASS FILTER

Figure 5:
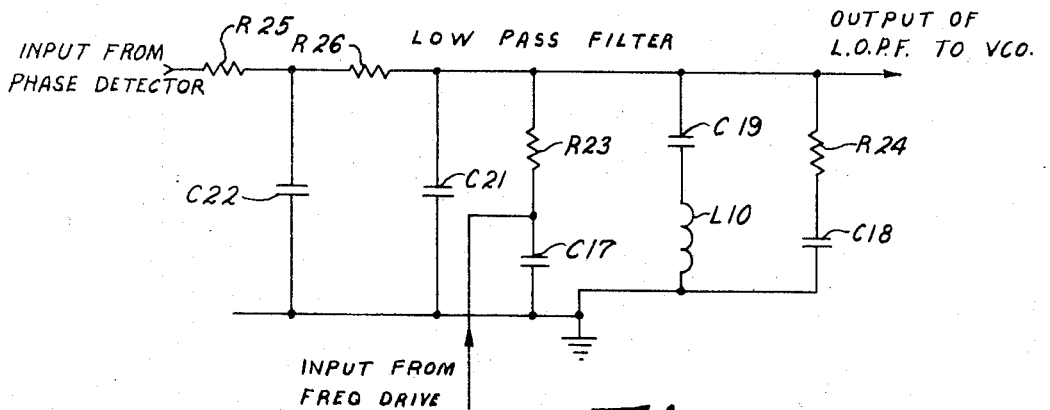
FIG. 5 is a circuit diagram of the low pass filter.

As seen in FIG. 5, the low pass filter has two inputs, one input from phase detector 46 and the other input from the frequency drive network of frequency discriminator 43. The purpose of the low pass filter is to convert the variable duty cycle square wave originating in the phase detector 46 to an average DC voltage value which may be used to tune VCO 45.

In conjunction with the tuning of the VCO, the low pass filter provides a summing point for the frequency drive voltage which is used to bring the VCO within the operating range of the phase detector during lockup or synchronizing of the VCO. Additionally, the low pass filter contains resistive-capactive networks which increase the stability of the stabilized master oscillator and are commonly referred to as lag networks. The first lag network is comprised of resistor R–23 and capacitor C–17. An additional final lag network includes resistor R–24 and capacitor C–18.

Since frequency discriminator 43 operates at a 1 kHz. rate, the predominant AC component in the variable duty cycle square wave will be 1 kHz. Thus, a 1 kHz. trap, C–19 and L–10, are incorporated in the low pass filter for the purpose of removing as much of the AC component from the square wave (the fundamental component of the reference rate) produced in the phase detector as possible.

When the stabilized master oscillator is "locked up" or operating in a stable condition, the output of phase detector 46 is the only signal input to the low pass filter. The signal from the phase detector is filtered by an RC filter including resistor R–25, capacitor C–22 and resistor R–26, capacitor C–21. Capacitor C–19 and inductor L–10 also assist in removing a portion of the 1 kHz. signal from the output of the phase detector. Additionally, the lag networks previously mentioned add stability to the system and perform a filtering function. The lag networks provide the required phase gain characteristic of the closed loop response of the SMO to add stability to the over-all system.

The frequency drive circuitry provides an output to the low pas filter (see FIG. 5) during the time that the stabilized master oscillator is "locking up" or becoming stabilized. This lockup period is required after frequency control head 48 has been changed to a new frequency value. When this new value requires a higher tuning voltage to bring the oscillator to the correct frequency, resistor R–27 and diode CR–16 (see FIG. 2a) provide a charging path for capacitor C–17. This path allows current to be fed to capacitor C–17 thus increasing the voltage at the output of the low pass filter. If a lower voltage is required after the new frequency is selected, resistor R–14 and transistor Q–20 provide a discharge path to reduce the voltage at the output of the low pass filter.

Thus, the low pass filter operates to combine two separate inputs, namely outputs from the phase detector and the frequency drive circuitry. The filter provides the characteristics needed to filter the phase detector output, the stability characteristics required for the servo system (discussed infra), and allows the time constant for the frequency drive network to be chosen independently and selected at optimum values for each (both high and low). Other systems of filtering and signal combining do not allow the parameters to be independently chosen for optimalizing each function.

AUDIO GAIN CONTROL AND AUDIO SQUELCH

Figure 7A:
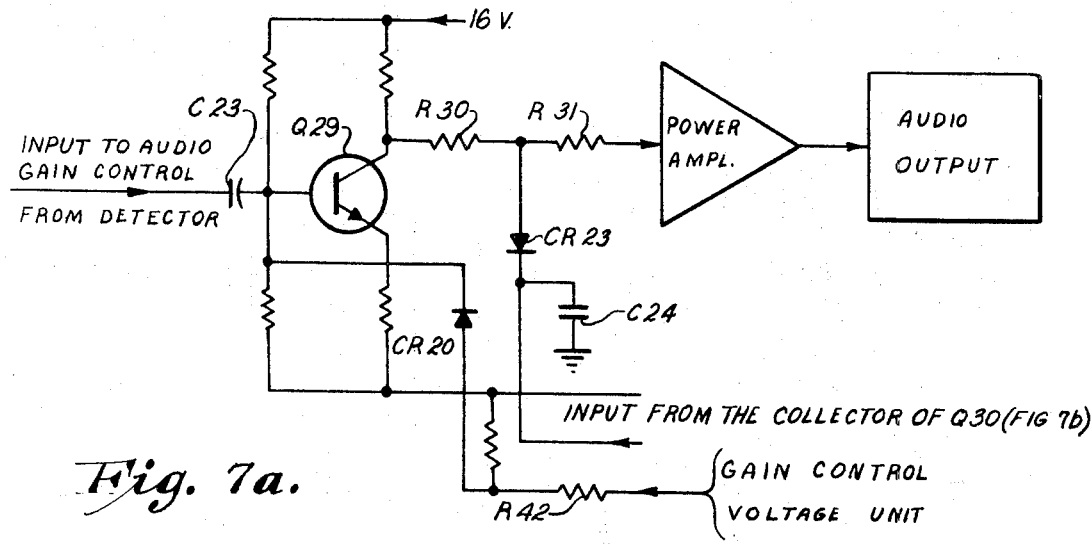
FIG. 7a is a combination schematic and block diagram of the audio gain control circuitry and squelch circuitry.
Figure 7B:
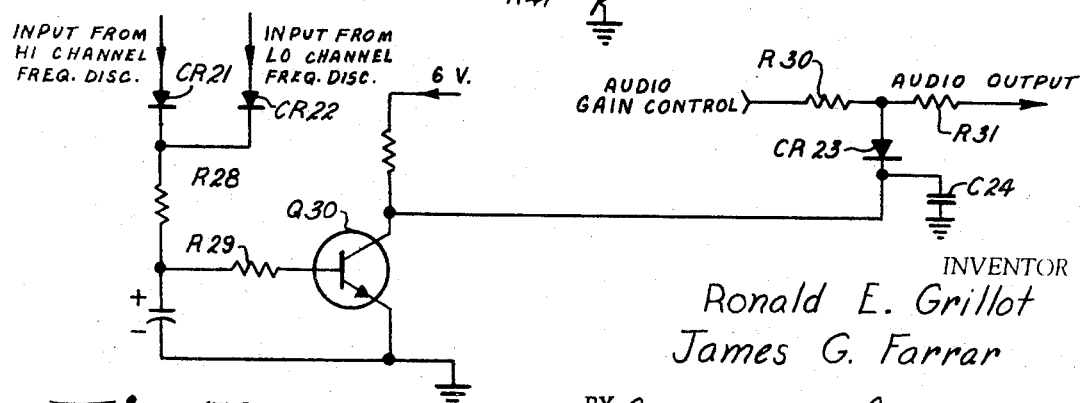
FIG. 7b is a schematic diagram of the squelch circuitry.

The audio gain control and combined squelch circuitry are shown in FIGS. 7a and 7b. The conventional method of audio gain control in an ADF is to route the AC signal to a potentiometer in the control head, attenuate the signal and then return same to the remote receiver. Shielded cables are generally required to prevent undesired pickups of interference. This method of audio gain control has several disadvantages in that there always exists the possibility of interference being picked up in the long cables running from the control head to the remote unit and secondly, the shielded cables are generally unwieldy and occupy too much space.

In the audio gain control circuitry described below, the possibility of pickup of interference is minimized and shielded or coaxial cables have been eliminated. As a result (installation is considerably easier, weighs less and requires less space through the use of smaller diameter cable.

Broadly speaking, the audio gain control circuit comprises a signal amplifier with a gain control input (FIG. 7a). The signal from the audio detector is applied to the amplifier input of the gain control stage and the resulting signal is used to drive the following stage of the audio power amplifier. The gain of the amplifier is controlled by a DC voltage applied to the gain control input. This DC voltage is produced in the control head, there being a potentiometer adjustable from 0 volts to 16 volts for use therewith.

The signal amplifier includes a bipolar transistor Q–29 (see FIG. 7a) whose gain characteristics are dependent on its collector current. The AC signal input to the audio gain control circuit is applied through capacitor C–23 to the base of transistor Q–29. The gain control voltage input is applied through resistor R–42, diode CR–20 to the base of Q–29 and, as suggested above, this voltage is adjustable from 0 to 16 volts.

At collector currents less than the break point value, the gain of the signal amplifier (Q–29) is a maximum. As the collector current its increased above the break point, the gain is reduced as the current is increased. In the full volume condition (minimum collector current), the transistor is biased for maximum gain. As the potentiometer (in the control head) setting is reduced, the gain control voltage is increased, thus the collector current increases and the gain of the transistor is reduced, thereby reducing the over-all gain of the audio amplifier. The signal from the collector of the signal amplifier (Q–29) goes through a portion of the squelch control circuitry, discussed later, and is applied to the input of a power amplifier. The power amplifier increases the power level of the detected signal and delivers same in the form of an audio output to the pilot's earphones (identified as "Audio Output" in FIG. 7a).

As suggested above, the audio gain control contains a portion of the audio squelch circuitry. We have found that as a general rule, the local oscillator in stabilized master oscillator systems experiences rapid changes in frequency from the time that the frequency is selected in the freqeuncy control head until the SMO is "locked up." This rapid change of oscillator frequency becomes apparent in the audio output as undesirable noises. The purpose of the audio squelch circuitry is to eliminate the amplification of the unwanted noises during the time the stabilized master oscillator is "locking up."

Referring now to FIG. 7b, the pulses from the high and the low channel of frequency discriminator 43 (FIG. 1b) are rectified in the audio squelch circuitry and converted to a DC voltage, same being used to disable the audio amplifier shown. In FIG. 7a. The rectification of the pulses from frequency discriminator 43 takes place in diodes CR-21 and CR-22 and is transferred from a common terminal to the base of transistor Q-30 through resistors R-28 and R-29. The DC current applied to the base of transistor Q-30 causes same to begin conducting current. The collector voltage of Q-30 begins to drop and this drop is transferred to a resistor-diode-capacitor network in the audio amplifier which, as suggested above, comprises a portion of the squelch control circuitry.

The above-mentioned resistor-diode-capacitor network in the audio amplifier includes resistors R-30 and R-31, diode CR-23, and capacitor C-24. As the collector voltage from Q-30 drops, this drop is coupled to the junction of capacitor C-24 and diode CR-23. Diode CR-23 will become forward biased, and thus able to conduct the AC signal to capacitor C-24 which will bypass the signal to ground. Accordingly, diode CR-23 and capacitor C-24 cooperate with resistor R-30 to form an AC voltage divider. Since the impedance of capacitor C-24 and diode CR-23 are low compared with the impedance of resistor R-30, nearly all the AC signal will be shunted to ground. It follows that the remaining signal at the junction of resistors R-30 and R-31 will be very low and therefore there will be essentially no signal for the remaining portion of the audio amplifier to amplify.

It is thusly seen that the DC voltage from the detector circuitry is applied to Q-30 which operates in conjunction with diode CR-23 as a switch to turn off the audio signal in the audio amplifier. At the time the stabilized master oscillator becomes "locked up," the pulses cease to be generated from the frequency discriminator and therefore the detector circuitry provides no DC current to turn on the "electronic switch" and the audio amplifier is allowed to amplify signals in a normal fashion.

VOLTAGE CONTROLLED OSCILLATOR AND ELECTRONIC BAND SWITCHING NETWORK

The voltage controlled oscillator (VCO 45) is shown in detail in FIG. 8 and is operative in a frequency range from 340 kHz. to 1839 kHz. The VCO frequency is 140 kHz. above the receiver frequency. Due to this wide tuning range, the range has been conveniently broken into three discrete tuning bands. It is not uncommon in ADF circuitry to provide discrete tuning by the utilization of two or preferably three such bands. In some ADF's, (as with the subject invention) the receiver is remotely located from the frequency control head and, as a result, a means must be provided for band switching which may be initiated at the control head but carried out in the remote receiver.

Previous units have accomplished such band switching mechanically by use of electric motors, relays or flexible shafts. These motor systems, including gear trains and rotating shafts, have a tendency to decrease reliability and to increase the cost per unit. Our invention provides for electrically eliminating the mechanical devices such as motors and mechanical switches. As a result, less space is utilized, the unit is lighter in weight, and has a higher reliability factor at a lower cost than what has heretofore been known.

Broadly speaking, the voltage controlled oscillator is comprised of a tuned circuit with a voltage sensitive tuning element located therein, a transistor oscillator amplifier and an associated feed back path. The frequency selected by the tuned circuit and amplified in the transistor amplifier is fed back in proper phase to the tuned circuit to sustain oscillations in the circuit.

The three frequency bands mentioned above may be conveniently referred to as the low band, the mid-band, and the high band. The low band operates in frequency ranges from 200 kHz. to 399 kHz., the mid-band from 400 kHz. to 829 kHz., and the high band from 830 kHz. to 1699 kHz. When the frequency control head is moved to a selected position, the voltage conditions on the two wires disclosed in FIG. 8 and identified as "high band" and "mid-band" (both being inputs from the control head) control the band switching operation of the VCO and other RF circuitry not shown. It will be shown that when the subject frequency head has been tuned to any frequency in the low band, neither of the two band switching wires are grounded. When the frequency is tuned to any frequency in the mid-band, the mid-band switching wire is grounded, and likewise when the control head is tuned to any frequency in the high band, the high band switching wire is grounded. All band switching wires will be at the same potential above ground when they are not grounded by switch contacts in the control head.

The tuned circuit shown in the left-hand portion of FIG. 8 includes inductors L-11, L-12, L-13 and the associated capacitors. The L-11 inductor is designated as the high band inductor, L-12 is the mid-band inductor, and L-13 is the low band inductor. The high band is comprised of only inductor L-11 (and associated capacitors), the mid-band being the series combination of inductors L-11 and L-12, and the low band includes the series combination of all three inductors L-11, L-12 and L-13.

Assuming that the control head has not applied a ground condition to either the high band switching wire or the mid-band switching wire, the high band inverting transistor Q-31 and the mid-band inverting transistor Q-32 will both be turned off. These inverting transistors operate to sense a grounded band switching wire condition and to provide an approximately 16 volt output to turn on the band switching transistors Q-33 and Q-34, respectively. Capacitors C-34 and C-35 are added to C-33 by Q-34' and Q-33', respectively, to maintain three-point tracking on each band. The concept of three-point tracking is commonly accomplished in most superheterodyne receivers.

During a mid-band switching function, the mid-band switching wire is first grounded by the frequency control head. Current is now caused to flow through the inverting transistor Q-32 which is a PNP transistor. The turning on of Q-32 results in the potential of the collector of same approaching the potential of the emitter (16 volts). The collector of Q-32 is connected through biasing resistor R-32 to the base of band switching transistor Q-34. Transistor Q-34 (the band switching transistor) is connected across the low band tuned circuit which operates to short out same to AC ground (line 50) thereby eliminating that portion of the tuned circuit from having further effect on the tuned circuit (with Q-34 turned on, the transistor, which s conneced in parallel with inductor L-13, acts as a closed switch).

The high band switching process operates in a similar manner, however it is combined with the mid-band circuitry. When the high band switching wire is grounded, current is caused to flow from the bases of high band transistor Q-31 and mid-band transistor Q-32 through diodes CR-28 and CR-29, respectively. The mid-band inverting transistor Q-32 turns on the mid-band switching transistor as discussed above and likewise the high band inverting transistor (Q-31) turns on the high band switching transistor Q-33 through resistor R-33 (the collector voltage on Q-31 also increases to near 16 volts as described above). With both Q-33 and Q-34 turned on, the low band L-13 and the mid-band L-12 (and associated capacitors) are shorted out to the AC ground. As may be seen from FIG. 8, turning on Q-33 connects the terminal junction between inductors L-11 and L-12 through the collector-base-emitter circuit of Q-33 to the AC ground (line 50 via line 51). The turning on of transistor Q-34 shorts out L-13 in a manner described above. It follows, that the low frequency band utilizes all inductor circuits (L–11, L–12 and L–13) when there is no ground condition on either the high band or the mid-band wires. The selective grounding of either the high band or the mid-band wire will respectively tune the oscillator to operation in the high band or the mid-band as required.

The output of the tuned circuit is fed via line 52 to the gate of a power amplifier junction field effect transistor Q–35 which in turn drives a two stage transistor amplifier that includes transistors Q–36 and Q–37. The two stages of the above-mentioned amplifier provide voltage gain and drive a limiter which is comprised of diodes CR–24 and CR–25. The above-mentioned limiter operates to provide a relatively constant voltage to the tuned circuit to prevent rectification in the tuning element described infra. The ouput voltage of the limiter is regeneratively fed back into the tuned circuit through resistor R–34.

The tuning voltage (a DC voltage) from the low pass filter 44 discussed above is applied to a voltage sensitive tuning element in the tuned circuit which is shown in FIG. 8 as variable capacitor C–25. In actual practice, this capacitor is a silicon junction diode whose characteristics are such that the capacitance of the junction thereof varies greatly with the voltage impressed across the junction. The capacitance of the junction diode (varactor) varies inversely with the voltage across the junction.

This tuning voltage from the low pass filter operates to vary the capacitance of C–25 in a controlled manner and to thereby control the oscillatory frequency of the VCO. For example, if the high channel of the frequency discriminator has an output (indicating that the divided frequency from the VCO is greater than the crystal reference frequency) the "drive low" circuitry produces an output which results in a reduction of the voltage applied to the VCO (the reduction of voltage increases the capacitance and decreases the frequency). As a result, the frequency of the VCO will be reduced as the capacitance of diode C–25 is increased with lower voltages across same. The reverse effect on the VCO is had when the "drive high" frequency discriminator increases the varactor tuning voltage.

OSCILLATOR LEVELER

The oscillator leveler circuitry is made up of transistor Q–38, dual gate field effect transistor amplifier Q–39, diode CR–30 and CR–31, in conjunction with other biasing resistors and filtering capacitors. The oscillator leveler circuitry shown in FIG. 9 operates from the VCO output. As a general rule, this output varies a great deal in amplitude. As a result, the leveler circuitry operates to produce an output which is constant or level in output amplitude.

The input from the VCO is applied to one gate on a dual gate MOS field effect transistor Q–39. The voltage applied at gate 1 is amplified by Q–39 and appears at the drain terminal 3 of Q–39. The amplified signal at drain terminal 3 of Q–39 is fed through capacitor C–36 to two diodes CR–30 and CR–31. These diodes rectify the signal and convert it to a DC voltage. The DC voltage is applied to the base of transistor Q–38 which amplifies the signal and varies the bias on gate 2 of Q–39. As the rectified signal increases, transistor Q–38 conducts more heavily and reduces the voltage on gate 2 of transistor Q–39.

In operation, the oscillator leveler maintains constant mixer conversion over the receiver tuning range by providing a constant oscillator injection level to mixer 26. This has the effect of reducing the gain of Q–39, thus decreasing the amplified signal on the drain terminals thereof. The reduction of the signal at the drain of Q–39 is fed back to transistor Q–38 as a reduction in DC voltage through capacitor C–36.

SERVO-AMPLIFIER AND INVERSE SERVO DAMPING

The signal from ADF detector 34 (FIG. 1b) is transmitted to servo-amplifier 37 (FIG. 1a) through loop slew control network control 36 (FIGS. 1a and 1b). The output of the loop slew control is fed to the input of servo-amplifier (see FIG. 10) through capacitors C–29 and resistor R–38. The servo-amplifier is a four stage transistorized amplifier which includes transistors Q–43, Q–44, Q–45 and Q–46. The final three stages (Q–44, Q–45 and Q–46) have a notch filter and a feed back path around same to provide frequency selective amplification. The notch filter is a shunt T-type RC network that includes capacitors C–30 and C–31 being shunted by resistor R–39. Resistors R–40 and grounded variable resistor R–41 are connected in series between the two above-mentioned capacitors.

The final three amplifier stages (Q–44, Q–45 and Q–46) include the negative feed back path through the notched filter back to the base of transistor Q–44. The frequency selective amplification is obtained by feeding back a preponderance of signals other than those which are desired. Since the feed back is degenerative and since the desired signal is rejected by the notch filter, the gain of the amplifier is at a maximum at the frequency which is desired.

The first stage of the amplifier, transistor Q–43, is not included in the negative feed back path, but provides a significantly higher output impedance and facilitates the use of the notch filter with its related frequency rejection characteristics. The final stage (Q–46) of the amplifier operates in such a manner that the quiescent or steady state DC current is reduced as the AC signal through the stage including transistor Q–45 is increased. For example, as the AC signal delivered to the final stage is increased, the base-emitter junction of Q–46 functions as a rectifier and discharges capacitor C–32 faster than R–44 can recharge it, thereby reducing the base bias on Q–46. This, in turn, operates to reduce the collector current which may be drawn through the servo motor winding.

The above-mentioned amplifier system is therefore operative to provide inverse damping for servo motor 38 which is an AC motor having a control phase winding and a reference phase winding. The method that is employed utilizes the principle that a DC current through winding of a two phase AC motor will cause the speed of the motor to be reduced. The damping effect of the DC current through one phase of the two phase motor has a greater effect at high speeds than at low speeds. It is for this reason that damping current adds increased stability to the servo system. The circuitry provided to drive the servo motor (the servo amplifier) is set up to provide the maximum desired steady state DC current in the motor under a no signal condition. As the drive signal to the servo system is increased, the steady state DC current is reduced by the AC signal, thus allowing the motor to turn at a faster rate of speed. As the AC signal reduces the DC current flow increases and a damping effect on the two phase servo motor. The net effect of the change of the DC current in the servo motor is to increase the damping at low signal levels and decrease the damping at higher levels. This allows the motor to run full speed under high drive signals and provides increased damping at the lower levels. This method accordingly reacts to provide a servo system an efficient speed of response, good accuracy and a high level of stability.

The DC current through the servo motor is set by the adjustment of the value of resistors R–43, R–44 and R–45. As the AC signal increases on the base of transistor Q–46, a portion of the signal is rectified as suggested above. Current will now flow from coupling capacitor C–32 to the base of transistor Q–46. The coupling capacitor will not be completely recharged through resistor R-44 and thus the average base current will be reduced. The reduction of base current causes a reduction in current through the variable phase of servo motor 38. This DC current is continually reduced as the AC signal becomes larger and allows the servo motor to turn at a faster rate. As the AC signal decreases, the rectified current in the base-emitter junction (Q-46) decreases and the steady state bias current is resumed through the transistor and eservo motor.

KDF-800

LOOP SLEW CONTROL NETWORK

Figure 10:
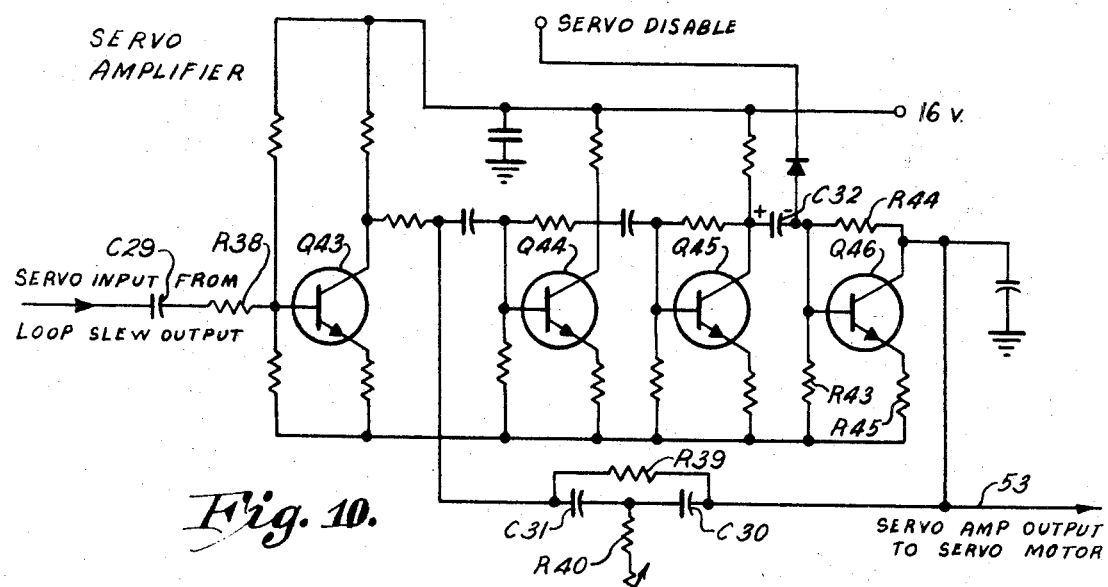
FIG. 10 is a schematic circuit diagram of the servo amplifier.

The loop slew control network shown in FIG. 11 is operable to select the desired input from the receiver and apply it to the servo amplifier shown in FIG. 10. One of the following three signals will be selected for the operation thereof; (1) the loop slew right; (2) the loop slew left signal; and (3) the servo detector input. Both the loop slew right signal and the loop slew left signal are delivered to the control network via individual amplifiers (not shown) from the loop modulation oscillator 38a (FIG. 1a).

The desired signal from the above-mentioned three sources is chosen by selectively grounding one of two wires, identified as Left and Right. For example, when neither of the two wires (Left or Right) is grounded, the signal from the ADF detector is automatically selected and fed to servo amplifier 37. When the Left wire is grounded, the signal providing a left-hand rotation of the pointer is selected by the loop slew network. The converse is applicable when the Right wire is grounded.

The loop slew control allows the pilot to manually rotate the pointer away from the indicated bearing of the station so that he may test the receiver for operation. As the pointer is manually rotated from the direction of arrival of the signal, it will return to the initial direction if the ADF is functioning correctly. As a result, the network is equipped with a Left and Right (the Left and Right grounding wires) slew position check which tests the rotation in both directions of the ADF pointer.

Turning now to a more detailed description of the control circuit, resistors R-46 and R-47 form a biasing network which operates to reverse bias diode CR-32. Simultaneously, resistors R-48 and R-49 provide a bias network to reverse bias diode CR-37 and to isolate or disconnect the loop slew right signal when the right wire is not grounded. Resistors R-50 and R-51 form a bias network to forward bias CR-34 through a grounded resistor on the cathode side in order to apply the ADF detector signal to the servo amplifier when neither the Left nor Right wire is grounded. The grounding of either the Left or Right wire results in diodes CR-36 or CR-35 being forward biased to turn off diode SR-34 through resistor R-51. At the same time, grounding of the Left wire forward biases diode CR-37 through resistor R-52 and R-49, thus completing the path from the loop slew left signal input to the input of the servo amplifier. This input path is through capacitor C-38 to the forward biased diode CR-37 to the terminal of the capacitor C-29 (FIG. 10), the input to the servo amplifier. When the Right wire is grounded, diode CR-32 is forward biased through the two resistors R-52 and R-47, thus completing the loop slew right signal path to the input of the servo amplifier. The path of the loop slew Right signal to the input of the servo amplifier is through capacitor C-39, forward biased diode CR-32, to the capacitor C-29.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An ADF that is tunable to a selected digitally represented frequency in a plurality of discrete frequency increments over a wide frequency range, said ADF operable to determine and display the direction of arrival of an electromagnetic wave corresponding to said selected digitally represented frequency, said ADF comprising:
   means for selecting said digitally represented frequency,
   means for determining the direction of arrival of said electromagnetic wave,
   said selecting means including a stabilized master oscillator, said stabilized master oscillator interconnected with said direction determining means, said stabilized master oscillator operable to tune said ADF to said selected frequency to thereby cause said direction determining means to determine the direction of arrival of said electromagnetic wave corresponding to said selected digitally represented frequency, said stabilized master oscillator also producing a local oscillator signal for said ADF.

2. The invention as in claim 1 wherein said ADF includes an audio amplifier for aural signals, a means for controlling the gain of said amplifier, said gain controlling means including a bipolar transistor, and means for applying an adjustable bias current to said transistor, thereby controlling the gain of said amplifier.

3. The invention as in claim 2 wherein said amplifier includes a squelch means for eliminating the amplification of unwanted noise signals.

4. The invention as in claim 3 wherein said stabilized master oscillator has a locked condition when said ADF is tuned to a desired frequency and an unlocked condition when said ADF is not tuned to a selected frequency, said squelch means including means for determining the condition of said stabilized master oscillator, and means for grounding said aural signals when said stabilized master oscillator is unlocked, thereby eliminating the amplification of unwanted noise signals.

5. The invention as in claim 1 wherein said ADF includes a servo system, said system being operable in conjunction with ADF error signals to position a bearing indicator, and a semi-conductor switching means for enabling said servo system for slew or error signal operation.

6. The invention as in claim 5 wherein said servo system includes an electronic means for damping said servo system, said damping means operable to reduce its damping effect on said system when said error signal increases in amplitude.

7. The invention as in claim 6 wherein said damping means includes a servo amplifier having a servo motor driving stage, means for biasing said driving stage at a low servo signal condition to draw maximum desired DC current through a servo motor and through said driving stage, and means for reducing said DC current as said servo signal increases.

8. The invention as in claim 7 wherein said servo motor is an AC motor having a control winding and reference phase winding, said biasing means operable to cause said DC current to be drawn through said control phase winding of said motor to controllably damp said servo system.

9. The invention as in claim 1 wherein said stabilized master oscillator includes a means for producing a crystal controlled reference frequency, and means for comparing said selected frequency with said reference frequency, said stabilized master oscillator being operable in accordance with a condition of said comparing means to tune said ADF.

10. The invention as in claim 9 wherein said comparing means operates to maintain said stabilized master oscillator in a tuned condition on said selected frequency.

11. The invention as in claim 1 wherein said stabilized master oscillator includes a means for producing a crystal controlled reference frequency signal, a voltage controlled oscillator having an output signal, means for dividing the frequency of the voltage controlled oscillator output signal, means for comparing the divided oscillator signal with said reference frequency signal, and means for changing said oscillator output signal in accordance with a condition of said comparing means to correlate said divided signal with said reference signal.

12. The invention as in claim 11 wherein said stabilized master oscillator includes a means for comparing the phase of the divided oscillator output with the phase of the reference frequency signal, and means for changing the phase of said oscillator output signal in accordance with a condition of said phase comparing means.

13. The invention as in claim 12 wherein said phase comparing means includes a means for producing a control output voltage which is a function of said phase difference, said control output voltage being operable to bring said divided oscillator signal into frequency coherence with said reference signal.

14. The invention as in claim 13 wherein said stabilized master oscillator includes a filter means for removing the AC components from said phase detector output and for stabilizing the closed loop response of the stabilized master oscillator.

15. The invention as in claim 14 wherein said filtering means includes a lag section, a resistor capacitor filter section and a trap section, said trap section operable to remove the AC component from said phase detector output.

16. The invention as in claim 11 wherein said ADF includes a means for maintaining said voltage controlled oscillator output signal at a constant amplitude.

17. The invention as in claim 16 wherein said maintaining means includes a signal amplifier having a gain characteristic that is a function of DC bias voltage means for converting the amplified signal to a DC biasing voltage and applying same to said signal amplifier in a gain controlling manner.

18. The invention as in claim 11 wherein said dividing means includes a counter having a plurality of outputs, an AND gate having a plurality of frequency selector inputs with corresponding counter inputs, said AND gate having an output coincident with the occurrence of selector inputs and corresponding counter inputs, said AND gate output being the divided output of said voltage controlled oscillator signal.

19. The invention as in claim 11 wherein said frequency dividing means includes a means for changing said frequency dividing means in accordance with the selected frequency so that the divided oscillator output signal approaches a preselected value.

20. The invention as in claim 19 wherein said comparing means includes a digital frequency discriminator, said discriminator being operable to digitally compare the frequency of said reference signal with the divided oscillator frequency, said discriminator having an output indicative of a difference in said frequencies.

21. The invention as in claim 20 wherein said stabilized master oscillator includes a frequency drive circuit, said frequency drive circuit connected to the output of said digital frequency discriminator and operable to cause said oscillator divided output to approach said preselected value.

22. The invention as in claim 21 wherein said stabilized master oscillator includes a filter means for regulating the speed at which the divided oscillator output approaches the said preselected frequency value.

23. The invention as in claim 22 wherein said voltage producing means includes a flip-flop circuit alternately triggered by the divided oscillator signal and by the reference signal respectively, said flip-flop having an output voltage in accordance with said triggering, the average value of same being operable to bring said divided oscillator frequency into frequency coherence with said reference signal.

24. The invention as in claim 20 wherein said frequency discriminator has a high channel and a low channel, said high channel including a means for comparing the frequency of the divided oscillator signal against the frequency of the reference signal, said low channel having a means for comparing the frequency of the reference signal against the frequency of the divided oscillator signal, said high channel having an output when the frequency of said divided oscillator signal is greater than the frequency of the reference signal, and said low channel having an output when the frequency of said reference signal is greater than the divided oscillator signal frequency.

25. The invention as in claim 24 wherein said frequency discriminator high channel includes a means for counting the number of divided oscillator cycles per reference cycle, and wherein said low channel includes a means for counting the number of reference cycles per divided oscillator cycle.

26. The invention as in claim 25 wherein said counting means in each channel has a count capacity of two.

27. The invention as in claim 1 wherein said ADF frequency range is divided into frequency bands, and means for electronically selecting the appropriate band in accordance with the frequency selected for ADF operation, said selecting means including semi-conductor means for shorting out each nonselected band.

28. The invention as in claim 27 wherein said frequency range is comprised of at least two bands, said selecting means including at least one transistor in parallel with at least one of said bands, said transistor being biased by said selecting means to short out its associated band upon a preselected condition.

29. The method of automatic direction finding in an ADF which determines and displays the direction of arrival of an electromagnetic wave corresponding to a selected frequency, said method comprising the steps of:

selecting a digitally represented frequency, producing a reference frequency signal, producing a signal having a controllable variable frequency, comparing the frequency of the reference signal and the frequency of said controllable variable signal, producing a control signal as a result of said comparing step, effecting the production of a local oscillator signal for said ADF from said control signal in accordance with the selected frequency, tuning the ADF to a frequency that corresponds to the selected frequency, mixing a received signal corresponding to the selected frequency with the local oscillator signal, and determining the direction of arrival of said electromagnetic wave corresponding to said selected frequency.

30. The invention as in claim 29 wherein said method includes the step of dividing the variable frequency signal by an integer which produces a desired relationship between the reference frequency and the variable frequency.

31. The invention as in claim 29 wherein said reference frequency is produced by a crystal controlled oscillator.

32. The invention as in claim 29 wherein said method includes the step of comparing the frequencies of the reference signal and the divided signal and
  comparing the phase of the reference signal and the divided signal, said phase comparing means operable to provide said control signal.

33. The invention as in claim 29 wherein said method includes the step of filtering said control signal.

References Cited

UNITED STATES PATENTS

| 3,060,427 | 10/1962 | Jaffe et al. | 343—113X |
| 3,390,392 | 6/1968 | Mayer et al. | 343—117 |

RODNEY D. BENNETT, JR., Primary Examiner

R. E. BERGER, Assistant Examiner

U.S. Cl. X.R.

343—113, 121